US006237961B1

(12) United States Patent
Trifanescu

(10) Patent No.: US 6,237,961 B1
(45) Date of Patent: May 29, 2001

(54) METHOD OF PERFORMANCE, EVALUATION AND PAYMENT OF THE ADVERTISEMENT IN THE COMMERCIAL TECHNIQUE AND APPARATUS

(76) Inventor: Florin Emil Trifanescu, Sos. Mihai Bravu 301, Bl. 8, et 7, Ap. 45, 74362 Bucharest (RO)

( * ) Notice: Subject to any disclaimer, the term of this patent is extended or adjusted under 35 U.S.C. 154(b) by 0 days.

(21) Appl. No.: 09/308,042
(22) PCT Filed: Nov. 11, 1997
(86) PCT No.: PCT/RO97/00005
§ 371 Date: May 7, 1999
§ 102(e) Date: May 7, 1999
(87) PCT Pub. No.: WO98/21696
PCT Pub. Date: May 22, 1998

(30) Foreign Application Priority Data

Nov. 14, 1996 (RO) .................................................. 96-02152

(51) Int. Cl.[7] .................................................. B42D 15/00
(52) U.S. Cl. .............................. 283/67; 283/70; 283/51; 283/56
(58) Field of Search ................................. 283/51, 56, 61, 283/62, 67, 70, 903; 281/2, 5

(56) References Cited

U.S. PATENT DOCUMENTS

| 4,195,864 | 4/1980 | Morton et al. . |
| 4,685,699 | 8/1987 | Hirasawa . |
| 5,501,491 | * 3/1996 | Thompson ............................ 283/51 |
| 5,537,314 | 7/1996 | Kanter . |
| 5,727,817 | * 3/1998 | Kraige ................................... 283/51 |

FOREIGN PATENT DOCUMENTS

WO94/04979 3/1994 (WO) .
WO96/36926 11/1996 (WO) .

* cited by examiner

Primary Examiner—Willmon Fridie, Jr.
(74) Attorney, Agent, or Firm—Herbert Dubno

(57) ABSTRACT

The invention refers to a advertising and marketing coupon used in the field of the commerce with products and services. The advertising and marketing coupon is made of a base coupon [1], a plurality of detachable affixed tickets[D'] and a detachable affixed universal ticket [E'] all made of a material suitable to be imprinted. The front side of the base coupon [1] comprises: an identification zone [A] where the denomination [A ZONE or A], the identification number of the coupon [COUPON NO. . . .], instruction, and advertisement are printed; a validation zone [B] where the denomination [B ZONE or B] and an inscribed [PLACE TO ATTACH TYPE E" TICKER] location are printed, the surface of the inside location being prepared to attach an universal ticket [E']; a confirmation zone [C] for the confirmation of the purchases made by the new recommended persons where the denomination [C ZONE or C] and a plurality [n] of inscribed [PLACE TO ATTACH TYPE E' TICKET] locations are printed, the surfaces of the inside locations being prepared to attach universal tickets [E']; a zone [D] where the denomination [D ZONE or D] is printed and which bears a plurality [n] of detachable affixed recommendation tickets [D']; a zone [E] where the denomination [E ZONE or E] is printed and which bears a detachable affixed universal ticket [E']; a detachable zone [F] constituting a partial coupon [F'] where the denomination [F ZONE or F], the same identification number as of the coupon and an inscribed [PLACE TO ATTACH A TYPE D' OR E'TICKET] location are printed, the surface of the inside location being prepared to attach a recommendation [D'] or an universal [E'] ticket.

6 Claims, 12 Drawing Sheets

METHOD OF PERFORMANCE, EVALUATION AND PAYMENT OF THE ADVERTISEMENT IN THE COMMERCIAL TECHNIQUE AND APPARATUS

CROSS REFERENCE TO RELATED APPLICATIONS

This application is the US national phase of PCT application PCT/RO97/00005 filed Nov. 11, 1997 with a claim to the priority of Romanian patent application 96-02152 itself filed Nov. 14, 1996 under the International Convention.

FIELD OF THE INVENTION

BACKGROUND OF THE INVENTION

1. Field of the Invention

The invention relates to an advertising an marketing coupon and the method of manufacturing and using it in the field of the commerce with products and services.

2. Description of the Prior Art

There is well known a multi-product coupon (U.S. Pat. No. 4,195,864) with which by attaching some tickets on a base coupon one can buy products with a reduction noted on the respective tickets. This type of coupon offers a discount only to the purchaser of the product.

The method (U.S. Pat. No. 4,195,864) consists in printing of a base coupon without value, having individualized locations indicating a type of product each, printing of a plurality of discount tickets identifying a different type of product each, providing the means to attach the tickets on the base coupon in order to form a discount coupon whose value is determined by the attached tickets. This method has the disadvantage that offering a discount only to the customers, they and the retailers are not stimulated to become promoters and to recommend the products or services.

There are some patents related to advertising which are based on computer systems. As an example it can be mentioned U.S. Pat. No. 5,537,314 which relates to a credit accumulation and accessing system for a plurality of sponsoring companies and participants having at each sponsoring company location a common bus which communicates with participant data input, performance data input, computer processing memory, an award output device, an input/output device and a central control center.

As another example we can also mention a multilevel marketing system (WO96/36926) where participants interact with a computer system to receive advertising, respond to market surveys, or place purchase orders.

None of these computer based systems involve the retailer and buyers as advertising promoters for products and the system at the same time and none of them use for demo purposes sold products and coupons.

SUMMARY OF THE INVENTION

The advertising and marketing coupon, as by the invention, obviates the mentioned disadvantages by the fact that it is composed of a base coupon, a number of recommendation detachable tickets, and a universal detachable ticket. On the front side of the base coupon there is an identification zone, followed by a validation zone, then another zone used for the confirmation of the purchases made by the recommended buyers, a zone with the recommendation detachable tickets, a zone with a universal detachable ticket and a last detachable zone which constitutes a partial coupon.

The method of manufacturing and using the advertising and marketing coupon, as by this invention, also obviates the mentioned disadvantages by the fact that, there are nominated the products and services for the advertising activity, the period of advertising activity is established, there are nominated the operators (retailer, the buyer who recommends and the recommended buyer), the value and the kind of the payment for the participating persons (operators) is stated, the maximum number of persons which can be recommended by a buyer is stated, the coupon its tickets and detachable zone are individualize by an identification number. The coupons are printed and the retailer receives one coupon for each product bought, the buyer receives the coupon corresponding to the purchased product, the retailer is rewarded, the buyers recommend other buyers and the last ones are rewarded, the buyer who recommended other buyers is rewarded, repetitive purchase is rewarded.

The invention has the following advantages: it diversifies the technologies of performance, evaluation and payment of the advertisement in the field of the commerce with products and services; stimulates the retailers, the buyers who recommend and the recommended buyers (as promoters); the numbers of operators is superior to the number of the sold units involving also the retailers; it needs minimal infrastructure to control the payment of the advertisement service; stimulates repetitive purchases; stimulates the group consciousness and the fidelity connected with a range of products or a distributor; alteration or stopping of the programme can be done without further problems; the payment of the operators depends on their real achievements and is made after cashing the corresponding ratio from the final buyer.

BRIEF DESCRIPTION OF THE DRAWINGS

The above and other objects, features, and advantages will become more readily apparent from the following description, reference being made to the accompanying drawing in which.

SPECIFIC DESCRIPTION

The advertising and marketing coupon, of the invention, is made of a base coupon 1, a number n of detachable recommendation tickets D' and a detachable universal ticket E'. The base coupon 1 has in his upper side an identification zone A, followed by a validation zone B, a confirmation zone C for the confirmation of the purchases made by the new recommended persons, followed by a zone D with n detachable recommendation tickets D', a next zone E having a detachable universal ticket E' and a last detachable zone F forming a partial coupon F'.

Figure 2:
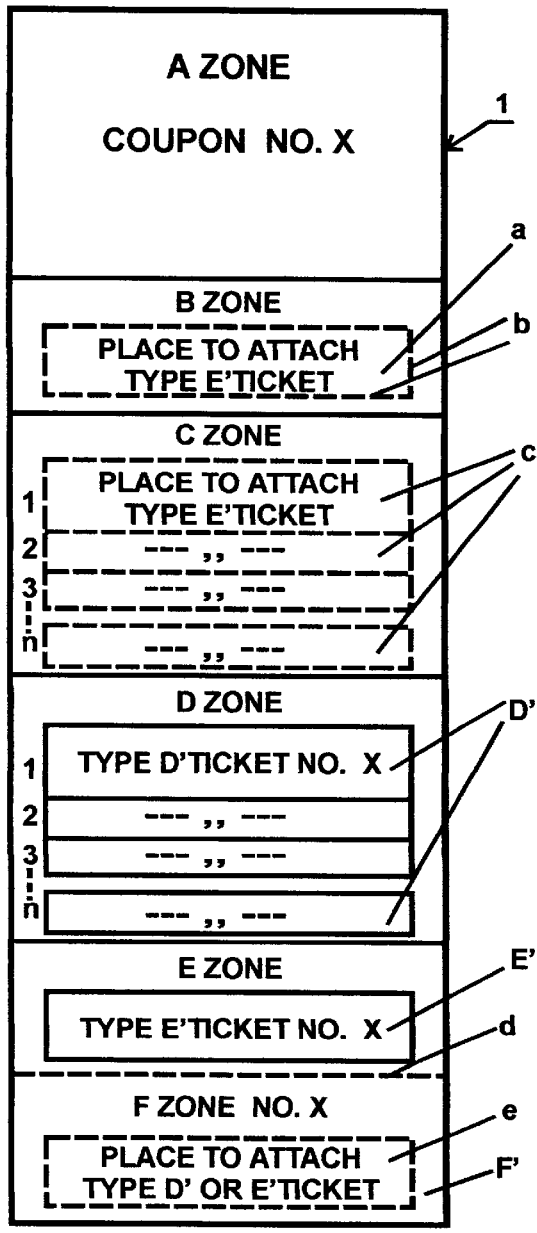
FIG. 2 is a front view of an advertising and marketing coupon.

The identification zone A of the base coupon 1 has the written denomination "A ZONE" (or simply A) and the identification number of the coupon written as "COUPON NO. . . ." (in FIG. 2 the coupon has the number X). In the identification zone A there can be printed brief instruction, and advertisements.

The validation zone B has a part where the denomination "B ZONE" (or simply B) is printed and has also an interior location a where the information "PLACE TO ATTACH TYPE E' TICKET" is printed. The surface of the location a is so prepared that it permits the attachment of an universal ticket E' from another advertising and marketing coupon. The attachment of an universal ticket E' in the location a validates the purchase of a second product or creates redemption value.

The confirmation zone C used for the confirmation of the purchases made by the new recommended persons has in its upper portion the inscription "C ZONE" (or simply C) and has n locations c. The locations c have the inside inscription "PLACE TO ATTACH TYPE E' TICKET", have the surface so prepared that permits the attachment of universal tickets E' proceeding from the coupons of the new recommended buyers in order to create redemption value and are as many as the number of persons that can be recommended by a buyer. On the left side of each location c there are noted the ordering numbers 1,2, . . . , n.

The zone D, with tickets, has in its upper side the inscription, "ZONE D" (or simply D) and has n detachable recommendation tickets D'. Each of the detachable recommendation tickets D' has the inscription "TYPE D' TICKET NO. . . .". The identification number of each recommendation ticket D' (NO. . . .) is identical with the identification number of the coupon, of the invention. In the example given in FIG. 2 the identification number of the coupon is X and also X is the identification number of the recommendation tickets D'. The recommendation tickets D' will be attached, in order to confirm the recommendation of new buyers and create redemption value, on the partial coupons F' corresponding to the coupons of these new buyers. On the left side of the detachable recommendation tickets D' are noted the ordering numbers 1,2, . . . , n.

The zone E, with one ticket, has in the upper side the denomination "E ZONE" (or simply E) and has one detachable universal ticket e'. On the universal ticket E' is printed "TYPE E' TICKET NO. . . ." and its identification number is the same as the identification number of the coupon, as by the invention. In FIG. 2 the universal ticket E' has NO. X because the coupon has NO. X marked in the identification zone A. The universal ticket E' detached from a coupon can be attached, depending of the situation in the following zones: in the zone F (partial coupon F') of the same coupon in order to create redemption value for the coupon redeemed by the retailer; in the confirmation zone C of the coupon corresponding to the person who recommends in order to confirm the purchase made by the recommended person and to create redemption value for the coupon redeemed by this buyer, in the validation zone B of the coupon corresponding to a person who buys a second product in order to validate the coupon which will be redeemed in the case the buyer recommended other buyers or in order to create redemption value for the coupon in the case the buyer without recommending other buyer makes this new purchase.

The detachable recommendation tickets D' as well as the detachable universal ticket E' incorporate on the back side an adhesive material so that they temporary adhere on the surfaces where they come from (that means to be detachable) and adhere on the surface to which they are transferred.

The zone F (partial coupon F') has in the upper side the inscription "F ZONE NO. . . ." (or simply F) and has the same identification number as the coupon (NO. X in FIG. 2). The partial coupon F' can be detachable, as shown by the dotted line d between the zones E and F. The partial coupon F' has a location e with the inside inscription "PLACE TO ATTACH TYPE D' OR E' TICKET". The surface of the location e is so prepared that can assure the attachment of the D' or E' tickets.

This construction of the coupon, as by the invention, assures: payment of the retailer for his advertisement activity; payment of recommended buyers in order to stimulate them to buy and to become buyers who can recommend; payment of buyers who recommend and convince new persons to buy; stimulating payment in the case of a repetitive purchase made by the same buyer.

Modifications of this invention may be practised without departing from the scope thereof.

Figure 8:
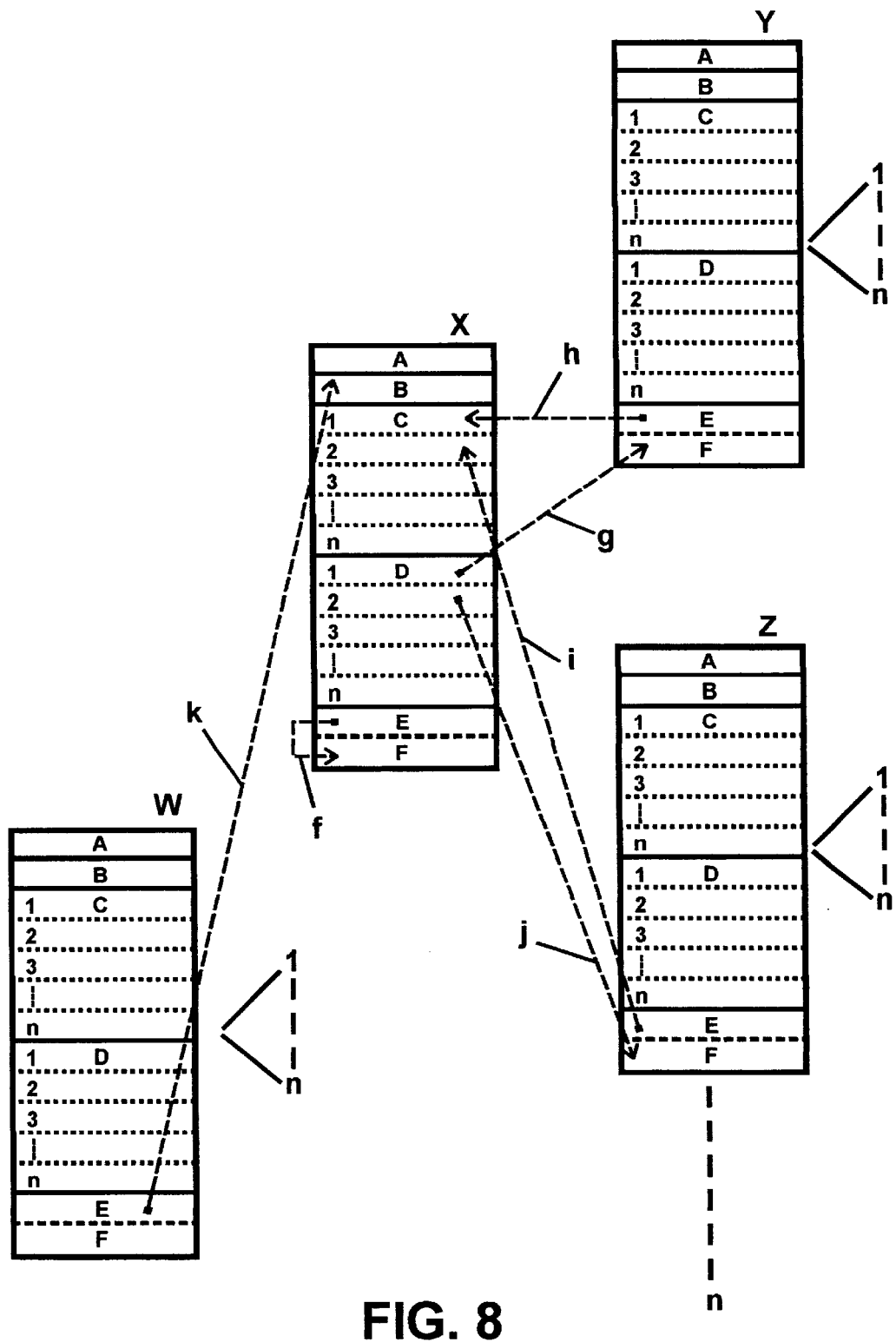
FIG. 8 is a schematic representation of the method of using the coupon, as by the invention, in the case the payment is granted only for the buyer who recommends with the confirmation of the recommendation.
Figure 9:
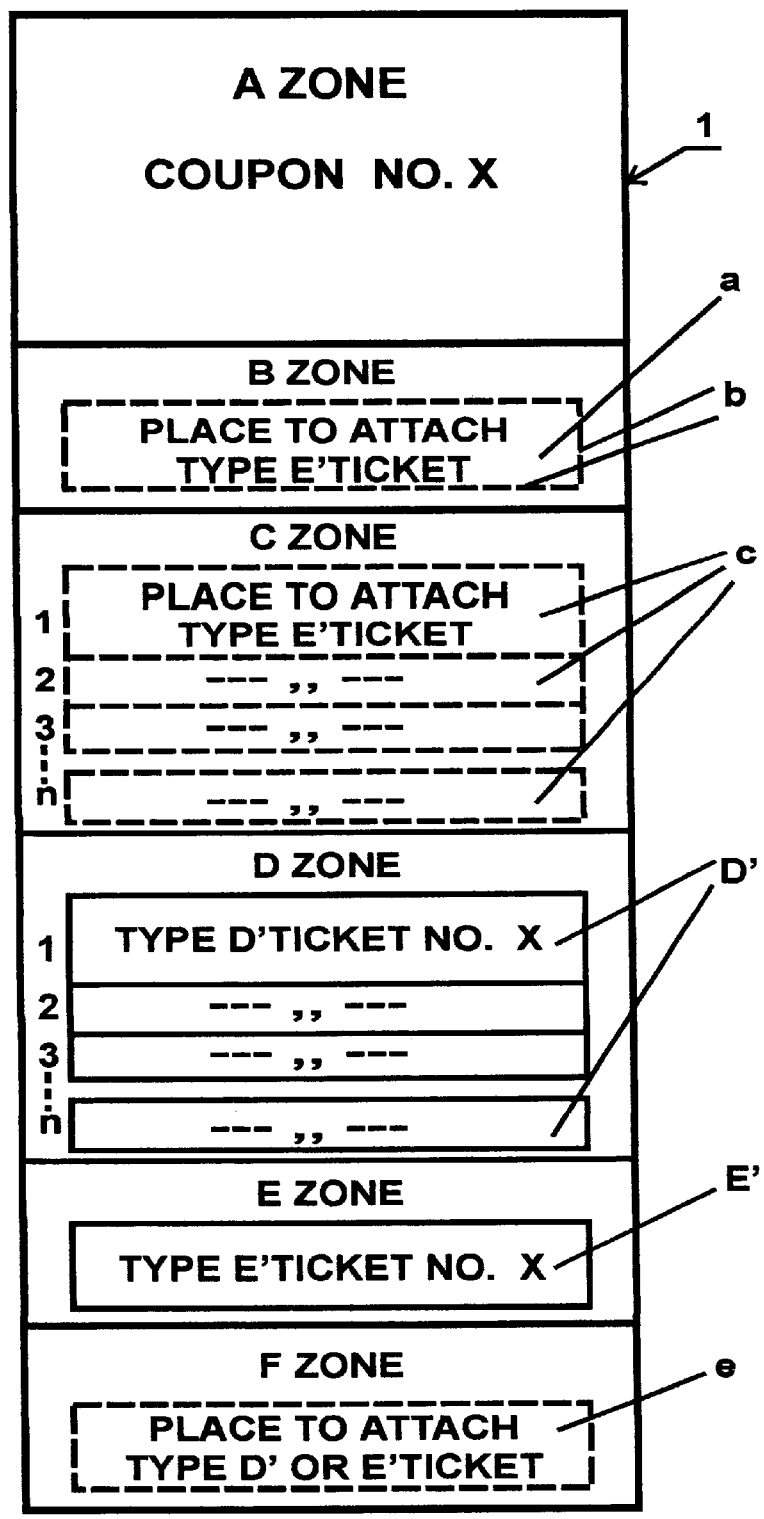
FIG. 9 is a front view of a coupon, as by the invention, in the case the payment is granted only for the buyer who recommends with the confirmation of the recommendation.

A second example of the coupon, of the invention, is presented in FIG. 9. This variant has the same components as the base coupon 1 with the difference that the F zone has no identification number and is not detachable. This variant of the coupon permits (FIG. 8) only the payment of the buyer who recommends with the confirmation of the recommendation and the stimulating payment in the case of a repetitive purchase.

Figure 10:
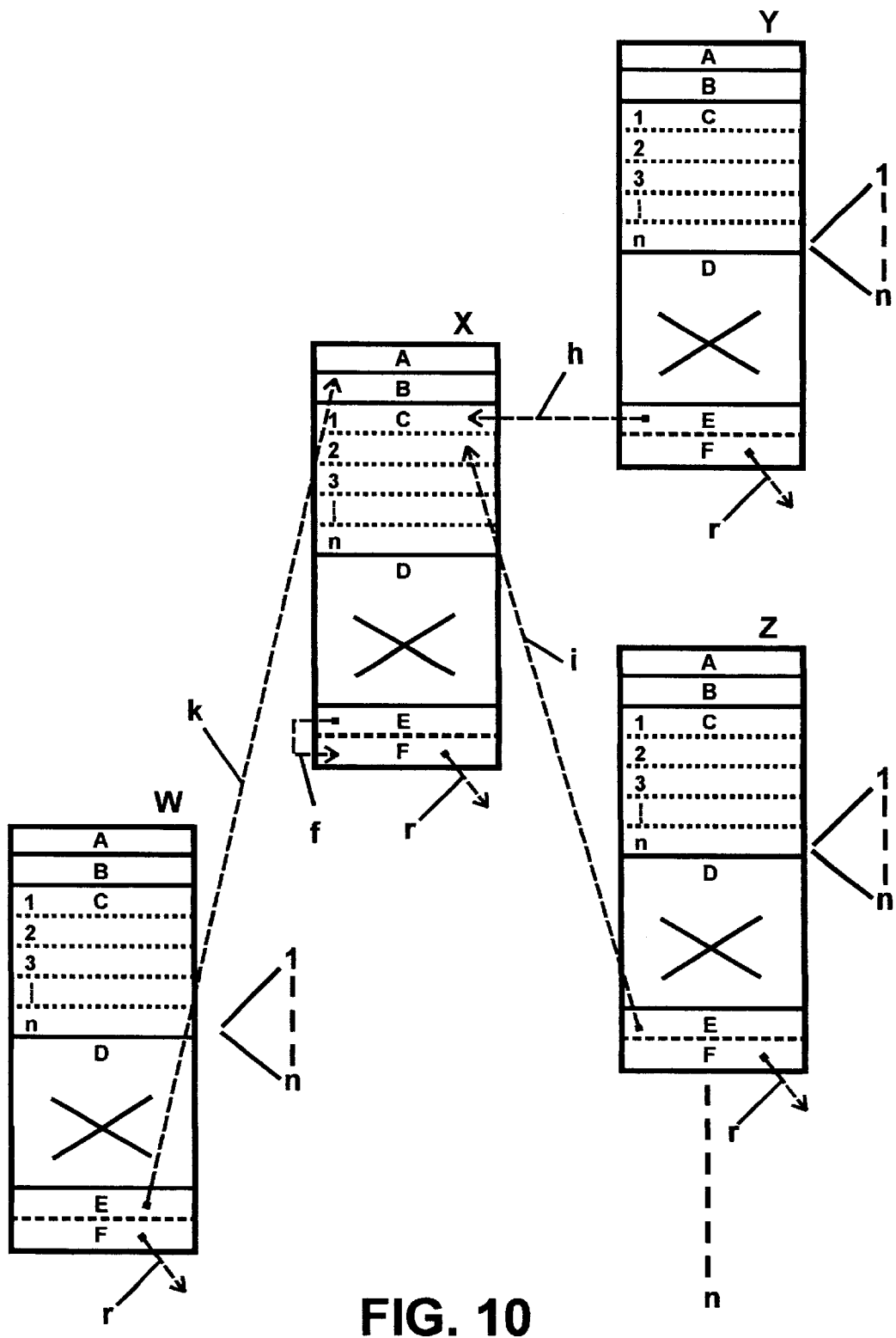
FIG. 10 is a schematic representation of the method of using the coupon, as by the invention, in the case the payments are granted only for the retailer and the buyer who recommends without the confirmation of the recommendation.
Figure 11:
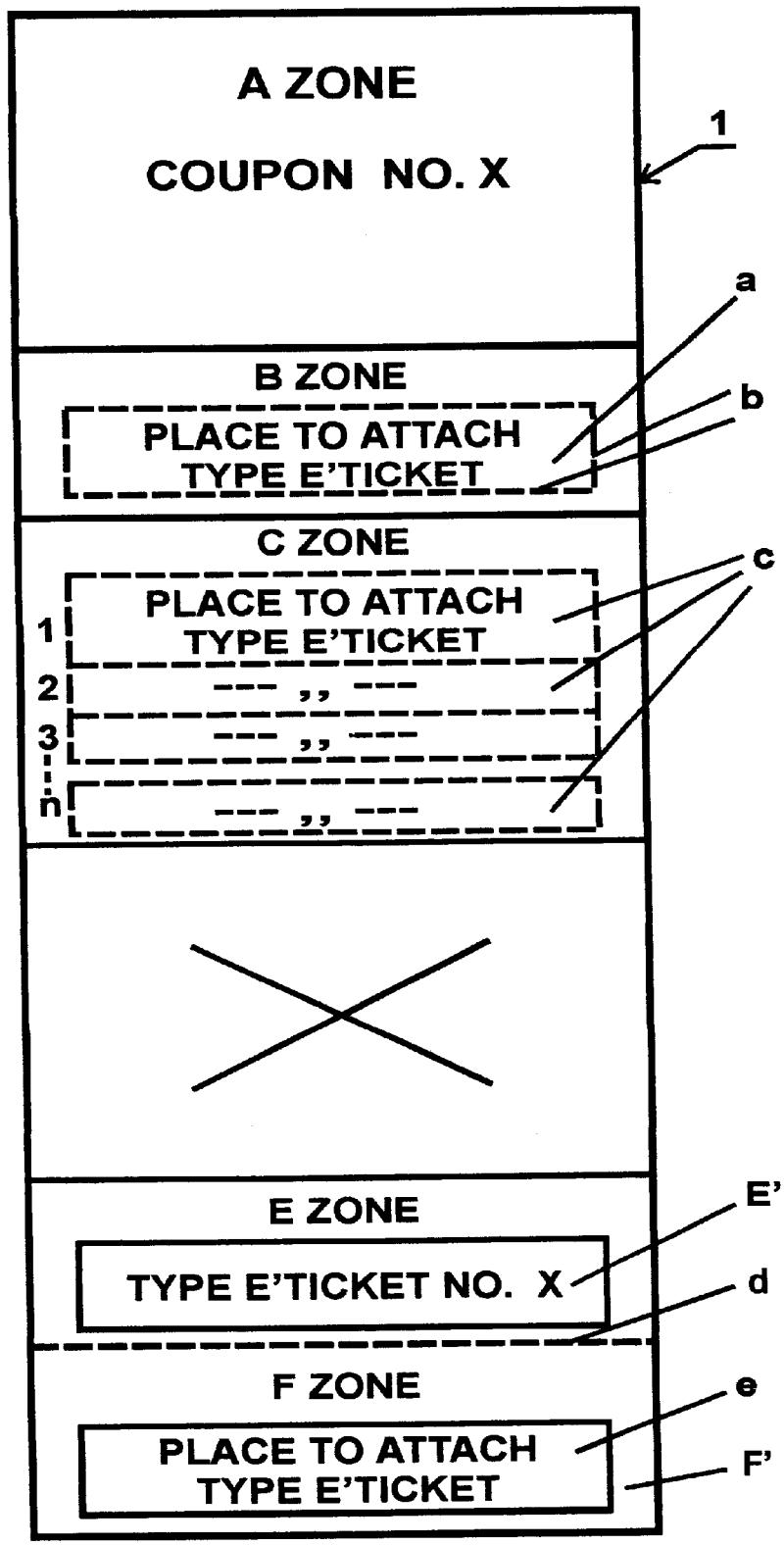
FIG. 11 is a front view of a coupon, as by the invention, in the case the payments are granted only for the retailer and the buyer who recommends without the confirmation of the recommendation.

The advertising and marketing coupon, of the invention, in a third variant is presented in FIG. 11 where we can see that the main parts are the same as those of the base coupon 1 less the zone D and the recommendation tickets D' which are eliminated. This construction of the coupon permits (FIG. 10) only: payment of the retailer, payment of buyer who recommends without of the confirmation of the recommendation and the stimulating payment in the case of the repetitive purchase.

Figure 12:
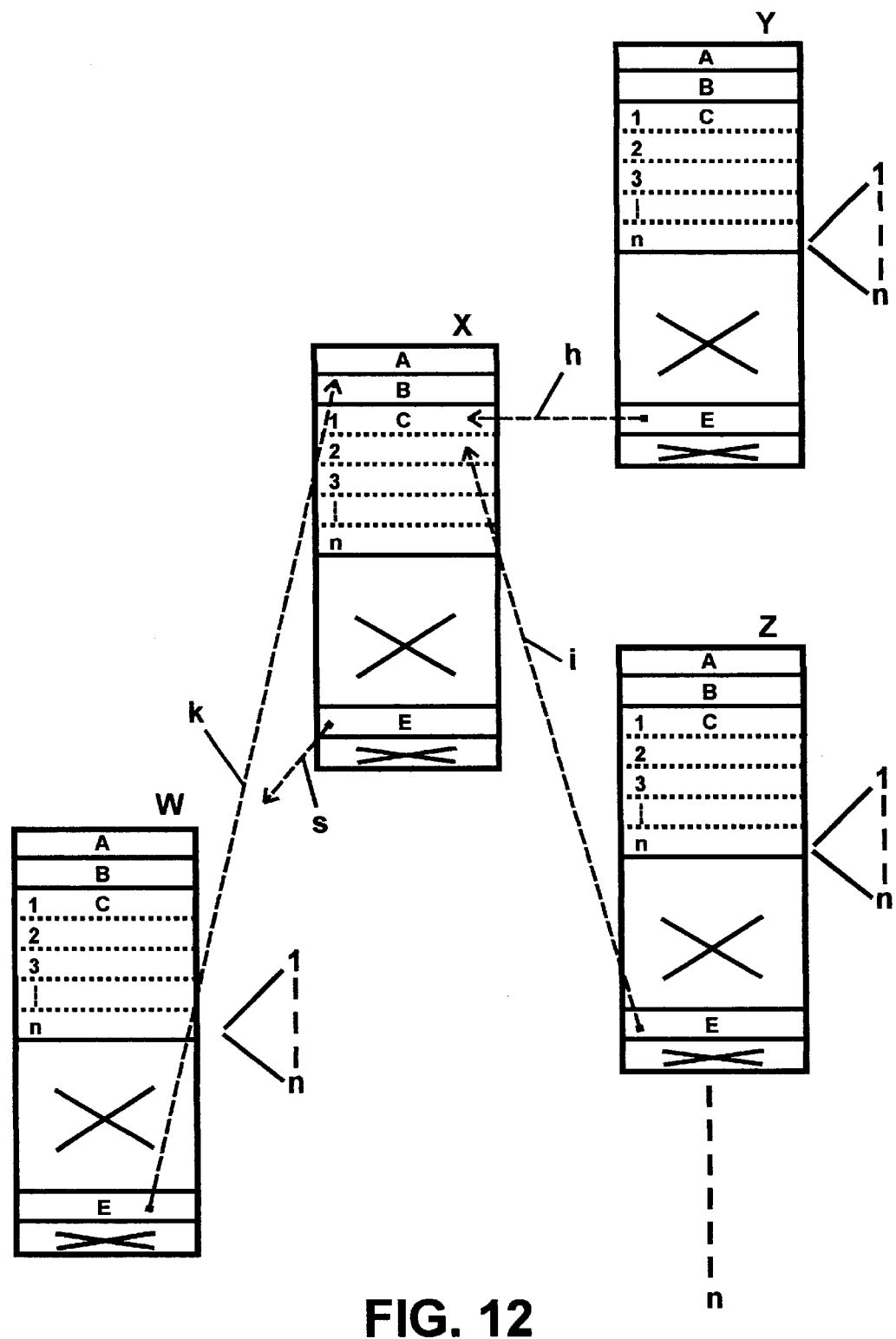
FIG. 12 is a schematic representation of the method of using the coupon, as by the invention, in the case the payment is granted only for the buyer who recommends without the confirmation of the recommendations.
Figure 13:
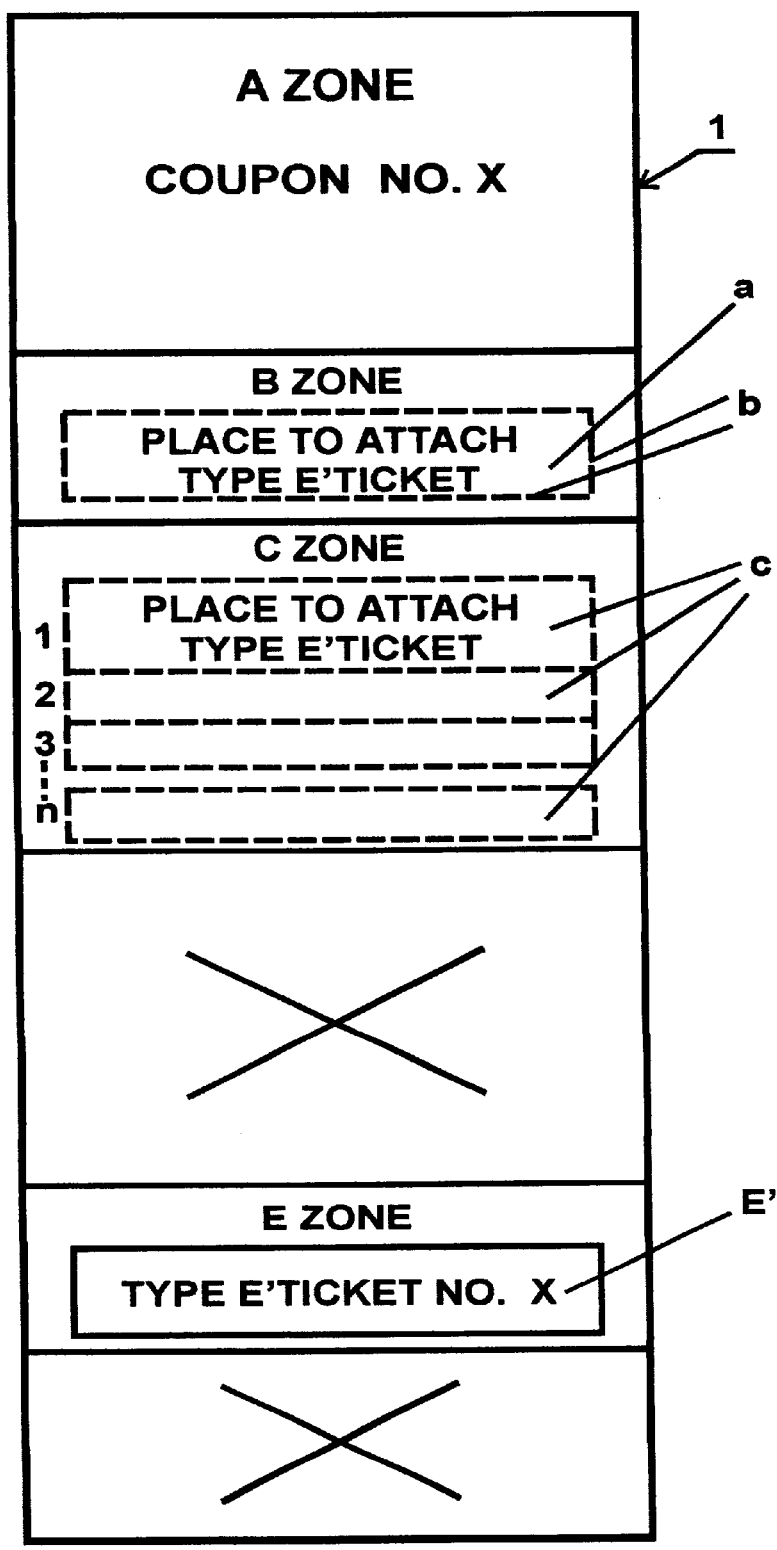
FIG. 13 is a front view of a coupon, as by the invention, in the case the payment is granted only for the buyer who recommends without the confirmation of the recommendation.

In FIG. 13 we can see a fourth variant of the coupon, as by the invention, in which where eliminated the zone D, the recommendation tickets D' and the zone F. This variant of the coupon is used (FIG. 12) only for the payment of the buyer who recommends without the confirmation of the recommendation and the stimulating payment in the case of a repetitive purchase made by the same buyer. The type E' ticket of the coupon corresponding to the initial buyer will be kept by the retailer (arrow s).

The method of manufacturing and using of the advertisement and marketing coupon consists of some stages detailed below.

In the first stage there is named the product or service of a given value (price) in whose distribution the advertisement and marketing coupon is used.

The second stage of the method consists in the establishment of the period of applying the same in which the products will be sold accompanied by coupons which are used in order to pay the advertisement activity made by the retailers and by the buyers who recommend and stimulate recommended buyers and of the repetitive purchases.

Establishment of the persons who will benefit by direct participation in the application of the method is the third stage. The method permits the following variants:

payment of the retailer, of the buyer who recommends and of the recommended buyer with the confirmation of the recommendation (FIG. 1), payment of the buyer who recommends with the confirmation of the recommendation (FIG. 8).

payment of the retailer and of the buyer who recommends without the confirmation of the recommendation (FIG. 10), payment of the buyer who recommends without the confirmation of the recommendation (FIG. 12).

The fourth stage of the method is the establishment of the amount and kind of payment for each participating person, payment which can be in form of cash, products, discount etc. For a product bought by a person who makes his first purchase only the retailer will be paid. For a product bought by a recommended buyer this buyer and the one who recommended him will be paid, the total amount of these payments being the maximum payment allotted for advertisement by this method of using the coupon.

The establishment of the maximum number (n) of persons who can be recommended by a buyer constitutes the fifth stage of the method. This number is a spur for the persons who recommend but, to fix it, it is necessary to take into consideration the value of the product and the number of products estimated to be sold.

The method has as a sixth stage to concede an identification number for each advertisement and marketing coupon, its corresponding detachable tickets and detachable zone (partial coupon).

In the seventh stage of the method there are printed the coupon and tickets and are provided means to combine them so that the method doesn't need infrastructure for its utilization and bookkeeping.

The eight stage of the method consists of handing over to the retailer the products and the corresponding coupons. The identification numbers of the coupons (current number, identical with the serial, etc.) can be noted for further evidences.

Figure 1:
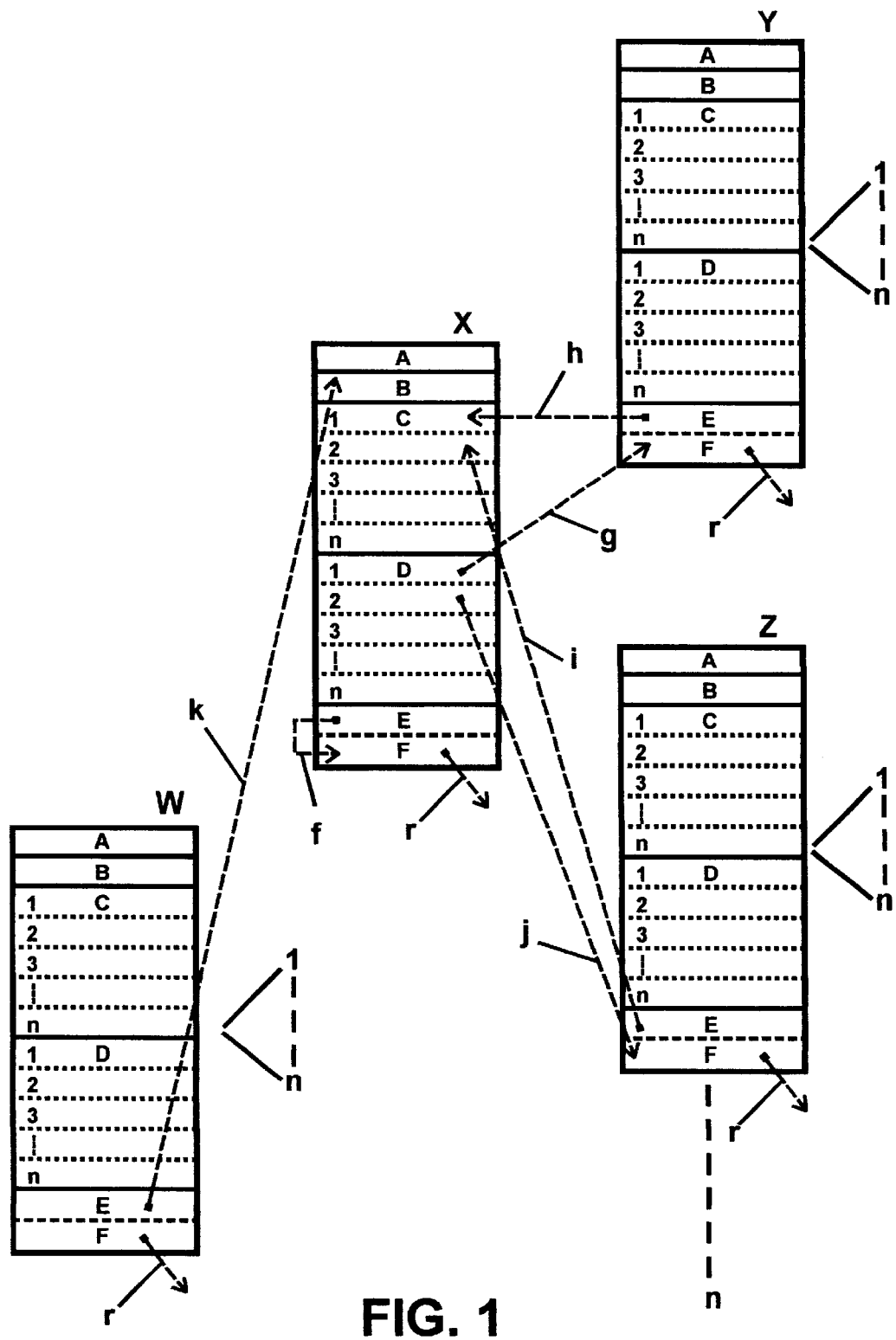
FIG. 1 is a schematic representation of the method of using the coupon, of the invention, where a buyer X recommends other two buyers Y and Z and then buys another product W.
Figure 3:
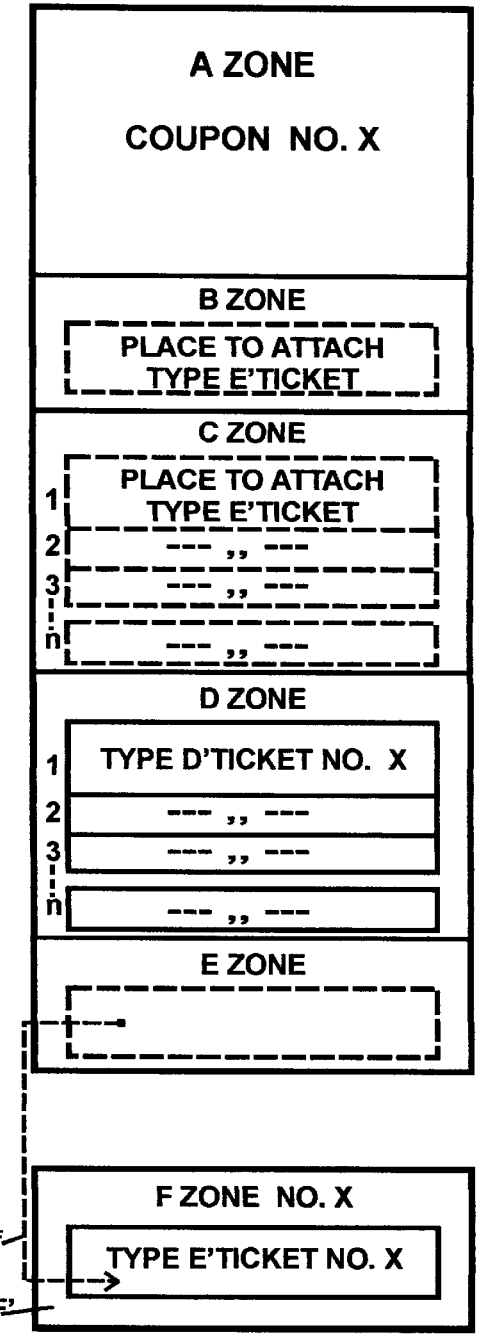
FIG. 3 is a schematic representation of creating redemption value of the coupon corresponding to the retailer (the arrow shows the transfer of the universal ticket)

In the ninth stage of the method the retailer presents to the buyer the coupon corresponding to the product, explains the functioning of the method and changes the position of a ticket on this coupon (see FIG. 1 and FIG. 3).

In the tenth stage of the method the retailer will receive a payment for his advertising activity presenting a partial coupon which acquired redemption value by attaching a ticket on it.

The eleventh stage of the method consists in the recommendation of new buyers and their payment. The operation of recommendation of new buyers and their payment is made by attaching a recommendation ticket from the coupon belonging to the buyer who recommends on the partial coupon of the new buyer, partial coupon which in this form acquires redemption value and justifies the payment of this new buyer.

The twelfth stage of the method consists in the payment for the act of recommending new buyers. Confirmation of the purchase made by a new recommended buyer is realized by attaching an universal ticket belonging to the coupon of this buyer on the coupon belonging to the buyer who recommended him. The payment of the buyer who recommended new buyers is determined by the overall redemption value of the universal tickets attached on his base coupon. In order to stimulate the sale, the payment for the act of recommending other buyers can be done on a new purchase and the confirmation of this new purchase is made by attaching an universal ticket taken from the coupon of this new purchase on the validation zone of the coupon which will be presented to be redeemed.

It is intended that the coupons corresponding to the buyers be redeemable at retailer stores and after that the retailer redeems these ones and his own redemption coupon at the wholesale stores or at the producer.

Further on we will present an example of using the advertisement and marketing coupon, as by the invention, illustrated also by the FIGS. 1,3,4,5,6 and 7.

In order to simplify the exposure it was noted with X the first buyer and also with X the coupon he receives when he buys the product (in figures COUPON NO.X or simply X). There were noted with Y and Z the buyers and the coupons received by those two new buyers (in figures COUPON NO.Y and COUPON NO.Z or simply Y and Z) who were convinced and recommended by the first buyer X to make the purchase. With W was noted the coupon (in figures COUPON NO.W or simply W) received by the first buyer who when convinced of the advantages, buys a second product.

The main operations are represented in the figures by arrows.

The first example, represented in FIG. 3, is that when a person (noted X) is convinced by the retailer to buy a product. The retailer detaches the universal ticket E' from the zone E of the coupon and attaches it on the partial coupon F' (arrow f), detaches the partial coupon F' and keeps it (arrow r in FIG. 1). The partial coupon F' having attached an universal ticket E', both having the same identification number [NO.X in FIG. 3] can be redeemed by the retailer in order to receive a payment for his advertisement and marketing activity.

Figure 4:
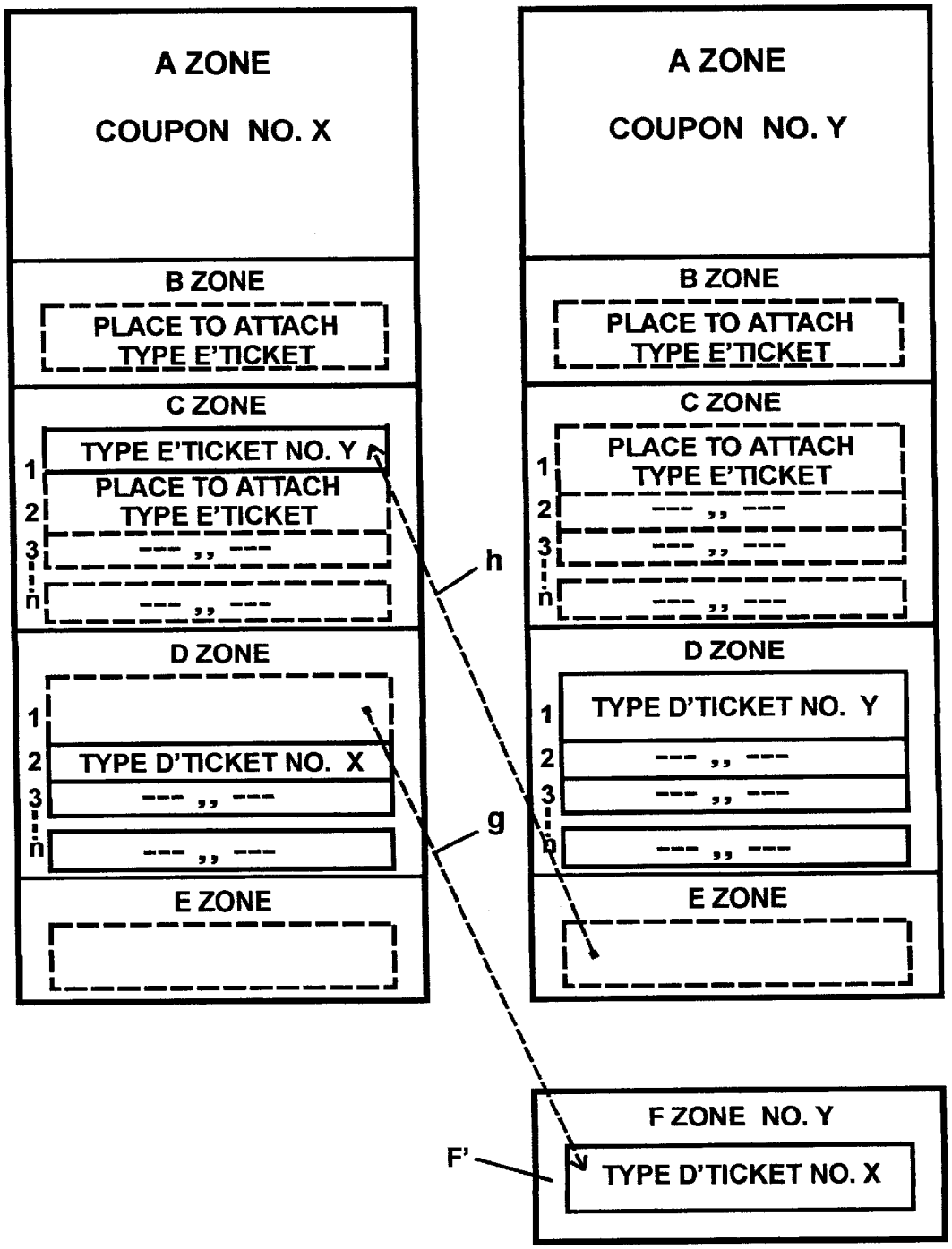
FIG. 4 is a schematic representation of creating value for the coupons corresponding to the first recommended buyer and to the buyer who recommended (the arrows indicate the transfer of tickets)

In FIG. 4 is presented in a graphic mode the method of using the coupons, as by the invention, in the case when a buyer X recommends a new buyer Y. We can see the two coupons: one of a first buyer noted with X (in FIG. 4 COUPON NO.X) who brought a second buyer Y who bought the product accompanied by the second coupon (in FIG. 4 COUPON NO.Y). We can easily see that the first coupon (of the buyer X) has not the partial coupon F' showing that he made a previous purchase.

After the new buyer Y bought the product a coupon, processed by the retailer, will be handed to him, the operations made by the retailer being shown by the two arrows g and h. The retailer transfers the first recommendation ticket D' (TYPE D' TICKET NO.X) from the coupon of the first buyer X on the partial coupon F' of the new recommended buyer X (arrow g) and keeps this partial coupon (arrow r in FIG. 1). As by using the coupon each buyer is stimulated, the new recommended buyer Y will receive a payment based on his partial coupon F', coupon which will be also redeemed by the retailer later on. The retailer transfers (arrow h) the universal ticket E' (TYPE E' TICKET NO.Y) from the coupon Y of the buyer recommended by X on the first place in the confirmation zone C of the coupon X thus confirming the effectuation of the purchase.

Figure 5:
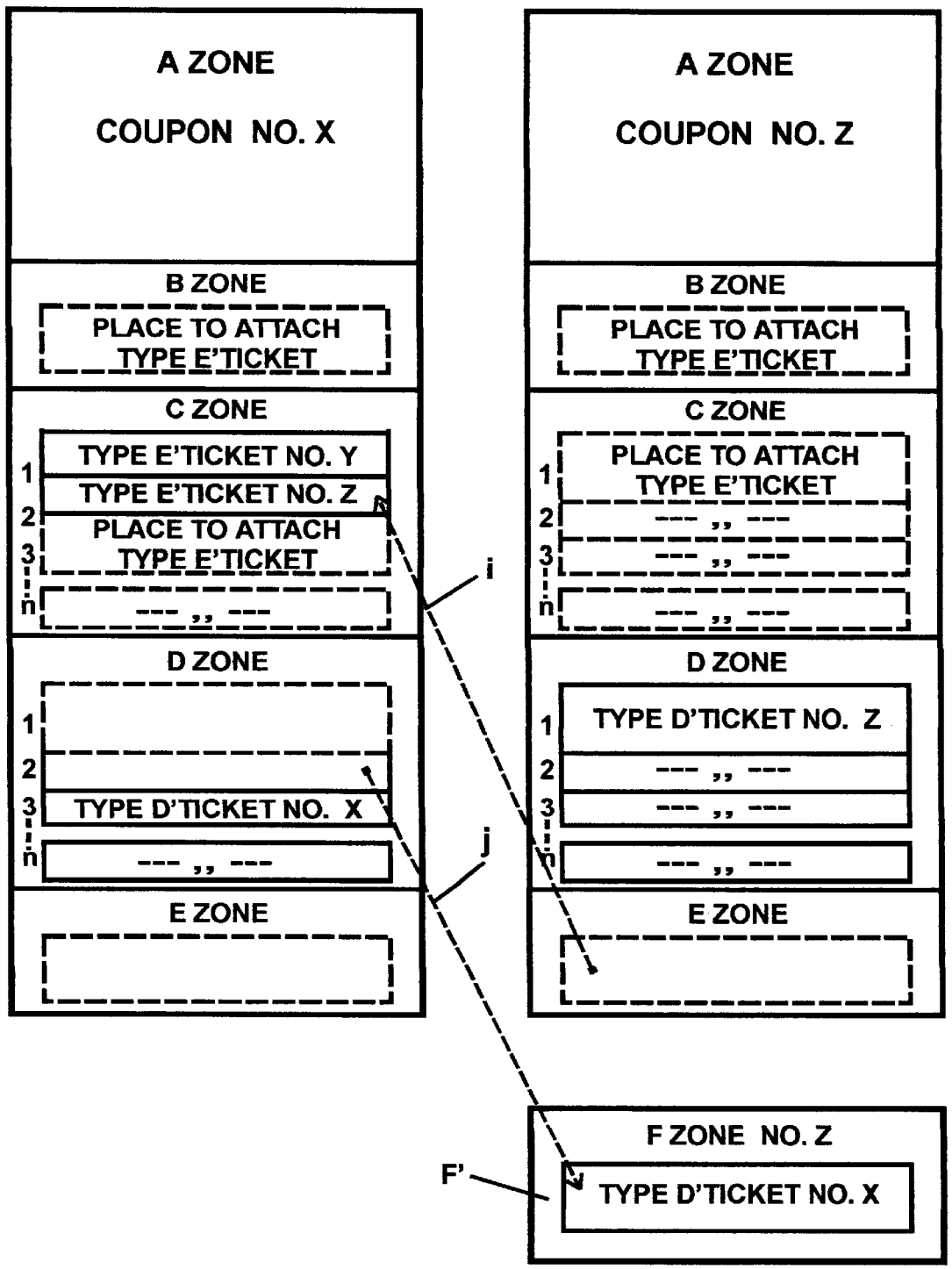
FIG. 5 is a schematic representation of creating redemption value for the coupon corresponding to the second recommended buyer and for the coupon of the buyer who recommended this second buyer.

In FIG. 5 is shown how, after recommending the buyer Y, the buyer X will make a new recommendation for the buyer Z the operations being symbolised by the arrows i and j. After this new recommendation the coupon X will have in the confirmation zone C two universal tickets E' corresponding to the coupons Y and Z and also two recommendation tickets D' missing. The retailer will remain, for ultimate redemption, with a new partial ticket F' having attached a recommendation ticket D' proceeding from the coupon X. The buyers Y and Z will remain with coupons having the zones A to E identical with those of the coupon of the buyer X after he made the purchase (see FIG. 3). Further on the buyers X, Y and Z can make other recommendations till they finish the n tickets of the zone D of each coupon, thing suggested by the vertical notations 1 . . . n which appears near each coupon in FIG. 1.

Figure 6:
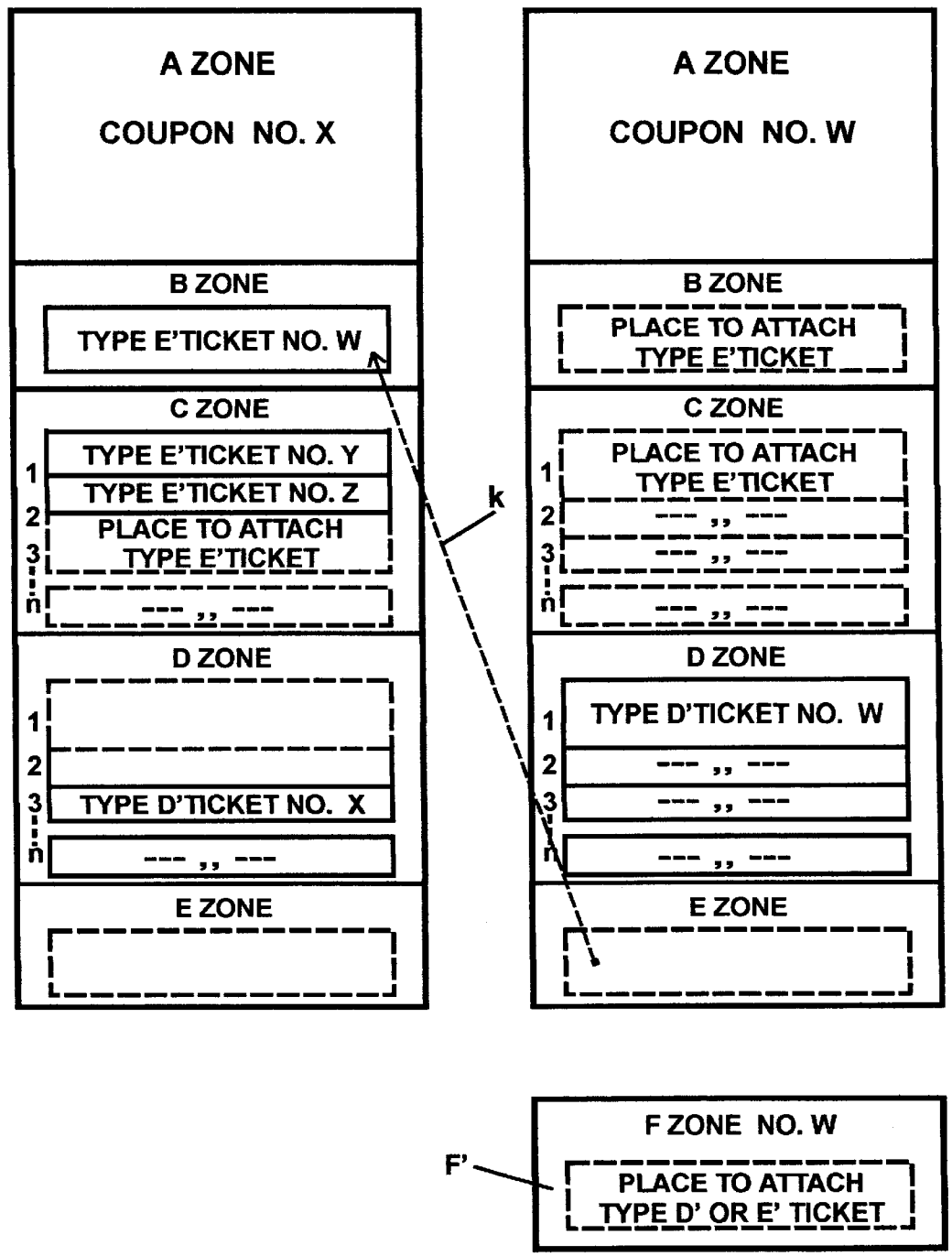
FIG. 6 is a schematic representation of validating the coupon, as by the invention, in the case the first buyer, after recommended other two new buyers, makes a new purchase.

In order to stimulate the sales, the payment of the recommendation activity can be done on a new purchase made by the buyer who recommended other new buyers. In FIG. 6 the buyer X after recommending the buyers Y and Z will make a new purchase and will receive the coupon W. In this case the universal ticket E' of the coupon W will be attached in the validation zone B of the coupon X (arrow k). In the case that the tickets E' attached in the zones B and C have different identification numbers (W, Y, Z) and also different from the identification number of the coupon they are attached on (X) and the quantity of the universal tickets E' attached in the zone C is the same with the quantity of recommendation tickets D' missing from the zone D, the buyer X will benefit of a payment equal to the overall redemption value corresponding to the universal tickets E' attached in the zone C. The coupon X in this presentation together with the partial coupon F' of the coupon W (the partial coupon F' having not tickets D' or E' attached) remain with the retailer and will be presented together later on in order to be redeemed.

If the payment of the recommendation activity is made without the obligation of a new purchase the coupon X presented to be redeemed will not have an universal ticket E' attached in the validation zone B and will not exist the partial coupon F' of the coupon W, the rest of the conditions being the same.

Figure 7:
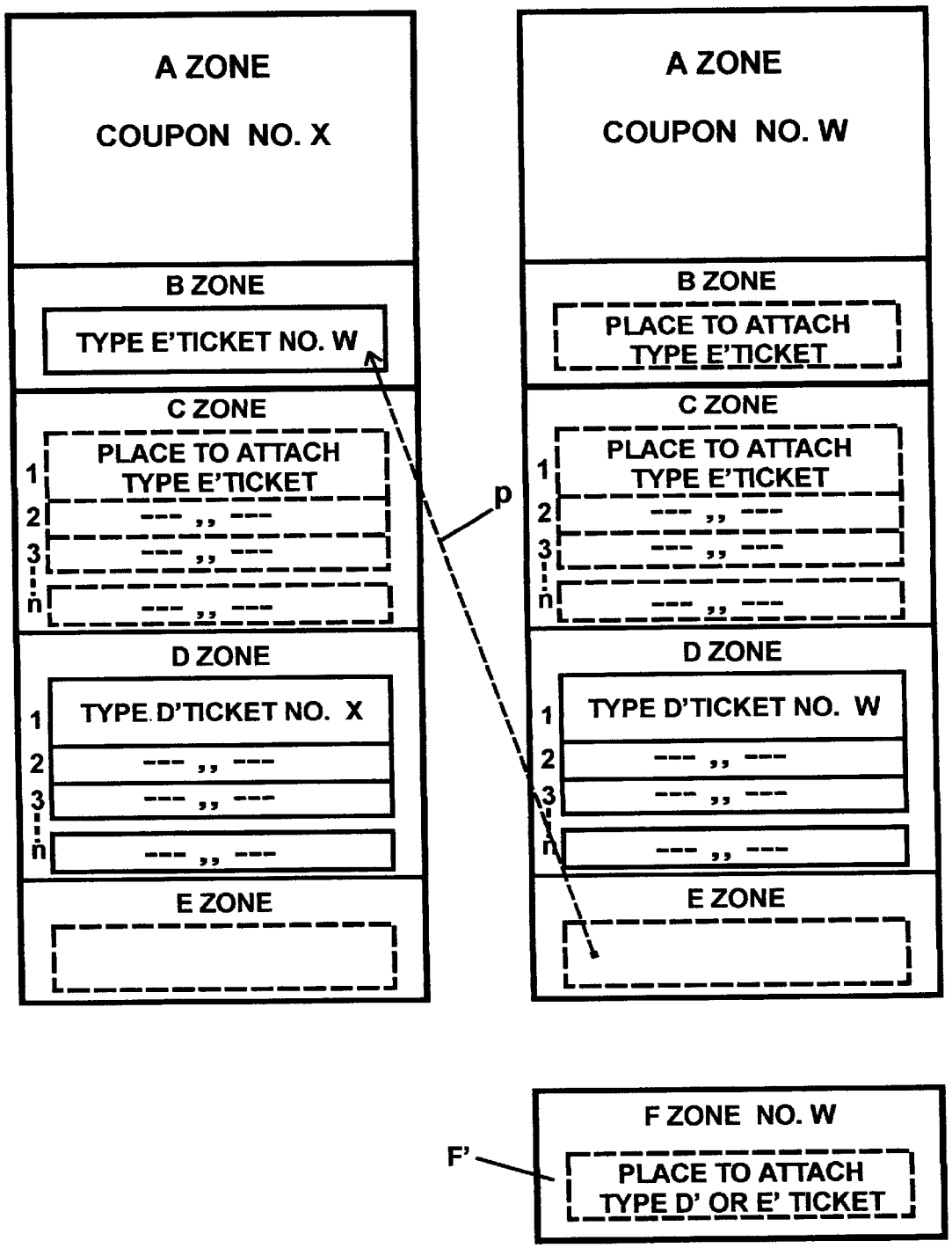
FIG. 7 is a schematic representation of creating redemption value for the coupon, as by the invention, in the case a buyer, without recommending other buyer, makes a new purchase (repetitive purchase)

In the case that a buyer X who didn't make any recommendation wants to make a new purchase he can choose the situation exemplified in FIG. 4, when he will receive a payment as a recommended buyer or the one exemplified in FIG. 7 when the universal ticket E' of the coupon W corresponding to the new purchase will be attached in the validation zone B of the coupon X (arrow p) in order to create redemption value and thus the possibility for the buyer X to receive a payment. The coupon of the buyer X having all the tickets in the zone D and with the universal ticket E' of the coupon W attached in the validation zone B, together with the clean partial coupon F' of the coupon W will remain with the retailer for a later redemption.

As, in order to be redeemed, the coupons for repetitive purchase (type E' ticket attached in the B zone), recommendation (type D' ticket attached on the partial coupon F'), confirmation of the purchase made by the recommended buyer (type E' ticket attached in the C zone) and retailer (type E' ticket attached on the partial coupon F') have different presentations these can also have different values.

The zones A,B,C,D,E can have any position on the advertisement and marketing coupon.

The operations of attaching the universal tickets E' in the zone C and of detaching the recommendation tickets D' from the zone D can be done in any order.

The zones C and D can be superposed and so, from the place where a recommendation ticket D' for the confirmation of the recommendation is detached an universal ticket E' can be attached in order to confirm the purchase made by the recommended person.

What is claimed is:

1. An advertising and marketing coupon comprising:
    a base coupon sheet having a first imprinted field identifying the coupon and a respective buyer, a labeled second field forming a validation zone, a third field, a fourth field and a detachable fifth field forming a part-coupon;
    a plurality of recommendation tickets in said third field imprinted with indicia identifying the coupon and corresponding to indicia in said first imprinted field and detachable from said third field for attachment to corresponding part-coupons of other buyers; and
    a universal ticket in said fourth field imprinted with indicia identifying the coupon and corresponding to indicia in said first imprinted field and detachable from said fourth field and selectively attachable in the respective fifth field of the respective part coupon for a sale involving the respective buyer and in the second field of a base coupon sheet of another buyer.

2. The advertising and marketing coupon defined in claim 1 wherein each base coupon sheet has a sixth field capable of accommodating a multiplicity of universal tickets from other coupons.

3. The advertising and marketing coupon defined in claim 2 wherein all of said tickets are adhesive labels and said second, fourth and fifth fields are surfaces to which said labels can be adhesively bonded.

4. The advertising and marketing coupon defined in claim 3 wherein said second, fourth, fifth and sixth fields are provided with imprinted indicia indicating a nature of tickets to be attached therein.

5. The advertising and marketing coupon defined in claim 4 in which said sixth field is formed with a number of locations for accommodating said multiplicity of universal tickets from other coupons equal in number to the number of recommendation tickets in said third field.

6. A method of advertising and marketing which comprises the steps of:
    (a) providing an advertising and marketing coupon having a base coupon sheet having a first imprinted field identifying the coupon and a respective buyer, a labeled second field forming a validation zone, a third field, a fourth field and a detachable fifth field forming a part-coupon;
    a plurality of recommendation tickets in said third field imprinted with indicia identifying the coupon and corresponding to indicia in said first imprinted field and detachable from said third field for attachment to corresponding part-coupons of other buyers;

a universal ticket in said fourth field imprinted with indicia identifying the coupon and corresponding to indicia in said first imprinted field and detachable from said fourth field and selectively attachable in the respective fifth field of the respective part coupon for a sale involving the respective buyer and in the second field of a base coupon sheet of another buyer; and a sixth field on each basis coupon sheet accommodating a multiplicity of universal sheets from other coupons, said method comprising the steps of applying a universal ticket from one coupon to the fifth field of the part coupon thereof and detaching the part coupon for redemption through a cellar and representing a purchase by the professor of the coupon;

(b) applying recommendation tickets to the fifth fields of part coupons of other buyers;

(c) applying universal tickets of other buyers in the sixth field of a coupon form which a recommendation ticket has been applied to the part coupon of such other buyer; and (d) applying a universal ticket to the second field for validation of a base coupon to enable recompense of a buyer possessing same.

\* \* \* \* \*